(12) United States Patent
Someschan et al.

(10) Patent No.: US 8,297,675 B2
(45) Date of Patent: Oct. 30, 2012

(54) INTERIOR TRIM PART FOR A PASSENGER COMPARTMENT OF A VEHICLE, AND METHOD FOR PRODUCING AN INTERIOR TRIM PART

(75) Inventors: Robert Someschan, Haan (DE); Rene Berns, Frechen (DE); Mark Drewe, Herzogenrath (DE); Roger Kaufmann, Bussilingen (CH)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 12/886,053

(22) Filed: Sep. 20, 2010

(65) Prior Publication Data
US 2011/0068596 A1 Mar. 24, 2011

(30) Foreign Application Priority Data
Sep. 21, 2009 (EP) .................. 09170812

(51) Int. Cl.
*B60R 13/02* (2006.01)
(52) U.S. Cl. ............... 296/1.08; 296/146.7; 280/751; 264/46.5; 264/510
(58) Field of Classification Search ......... 296/146.7, 296/153, 39.1, 146.6, 146.5, 187.02, 1.08, 296/1.02, 1.09, 187.05
See application file for complete search history.

(56) References Cited

U.S. PATENT DOCUMENTS

| 5,082,609 | A * | 1/1992 | Rohrlach et al. .............. 264/46.4 |
| 5,304,273 | A * | 4/1994 | Kenrick et al. ............... 156/219 |
| 5,401,449 | A * | 3/1995 | Hill et al. ..................... 264/46.4 |
| 6,017,617 | A * | 1/2000 | Gardner, Jr. ............... 428/309.9 |
| 6,248,200 | B1 | 6/2001 | Dailey et al. |
| 6,908,144 | B2 * | 6/2005 | Gotzinger et al. ....... 296/187.05 |
| 6,921,571 | B2 * | 7/2005 | Funakoshi .................... 428/156 |
| 6,982,021 | B2 * | 1/2006 | Spengler ....................... 156/221 |
| 7,005,092 | B2 * | 2/2006 | Dooley et al. ................ 264/46.5 |
| 7,247,382 | B2 * | 7/2007 | Gardner, Jr. ............... 428/424.6 |
| 7,425,029 | B2 * | 9/2008 | Dooley et al. ................ 296/1.08 |

FOREIGN PATENT DOCUMENTS

| DE | 102004023823 B4 | 12/2005 |
| DE | 102004025570 A1 | 12/2005 |
| EP | 1287961 A2 | 8/2002 |
| FR | 2855782 A1 | 9/2004 |
| FR | 2886571 A1 | 6/2005 |

OTHER PUBLICATIONS

European Search Report from EP Application No. 09170812, dated Sep. 15, 2010, 7 pages.

* cited by examiner

*Primary Examiner* — Glenn Dayoan
*Assistant Examiner* — Sunsurraye Westbrook
(74) *Attorney, Agent, or Firm* — Raymond L. Coppiellie; Price Heneveld LLP (57) ABSTRACT

An interior trim part for a passenger compartment of a vehicle has a shaped part which has a front side which forms a decorative wear layer of the interior trim part, and having at least one carrier layer which forms a rear side of the interior trim part, at least one part region of the interior trim part being provided with at least one supporting structure which provides a pleasant tactile sensation at the surface of the part region, the shaped part having at least one connecting element which is attached to the carrier layer of the rear side of the internal trim part, and the supporting structure being formed as a separate supporting element and being held by the connecting element of the shaped part. Moreover, a method for producing an interior trim part for a passenger compartment of a vehicle is also provided.

19 Claims, 5 Drawing Sheets

Fig. 5

INTERIOR TRIM PART FOR A PASSENGER COMPARTMENT OF A VEHICLE, AND METHOD FOR PRODUCING AN INTERIOR TRIM PART

FIELD OF THE INVENTION

The present invention generally relates to an interior trim part for a passenger compartment of a vehicle and a method for producing an interior trim part.

BACKGROUND OF THE INVENTION

Automotive vehicles are commonly equipped with interior trim parts. Interior trim parts employed in vehicles generally include soft surfaces in which a passenger may come into contact during operation of the vehicle. For example, a vehicle door can be provided with an interior trim part which has an integrated armrest. The vehicle interior trim part can also have an ergonomic function, as in the case of an integrated armrest on which the passenger is able to support oneself comfortably.

German Publication No. DE 10 2004 023 823 B4 discloses an example of a method for producing an interior trim part. The interior trim part which is produced according to the method has a supporting structure, in which soft foam has been injected into a chamber of the interior trim part. The foam is given its shape because the process generally takes place in a mold.

Another method for producing interior trim parts is proposed in European Patent Publication No. EP 1 287 961 A2. The latter contains two examples in FIGS. 1 and 2 of interior trim parts which can be produced according to this method. Both examples likewise have a supporting structure which is provided with foam. However, the foam is not foamed in the mold, but rather is previously cut to size from a block. Subsequently, the foam blank is formed together with a wear layer by way of a thermoplastic process in the mold using pressure and heat, and is connected to the wear layer.

It is desirable to provide for enhanced interior trim parts for the passenger compartment of a vehicle which are cost effective to manufacture.

SUMMARY OF THE INVENTION

According to one aspect of the present invention, an interior trim part for a passenger compartment of a vehicle is provided. The trim part includes a shaped part comprising a front side which forms a decorative wear layer of the interior trim part and at least one carrier layer which forms a rear side of the interior trim part. The shaped part has at least one connecting element which is attached to the carrier layer of the rear side of the interior trim part. The trim part also includes at least one supporting structure provided with at least one part region of the interior trim part. The at least one supporting structure provides a pleasant tactile sensation at the surface of the part region. The supporting structure is formed as a separate supporting element and is held by the connecting element of the shaped part.

According to another aspect of the present invention, a vehicle interior trim part is provided. The trim part includes a shaped part comprising a decorative wear layer, a carrier layer, and a connecting element attached to the carrier layer. The trim part also includes a supporting structure providing a pleasant tactile sensation. The supporting structure is formed as a separate supporting element and is held by the connecting element.

According to a further aspect of the present invention, a method for producing an interior trim part for a passenger compartment of a vehicle is provided. The method includes the steps of producing a shaped part with a decorative wear layer and at least one carrier layer and inserting the finished shaped part into an injection molding die. The method also includes the steps of attaching at least one connecting element in the part region of the rear side of the interior trim part by overmolding the carrier layer by way of an injection molding die and removing the overmolded shaped part from the injection molding die. The method further includes the steps of producing at least one supporting structure as a separate supporting element with at least one connection means compatible with the connecting element of the shaped part which is attached to the carrier layer, and mounting the supporting element on the shaped part by connection of the connection means of the supporting element to the connecting element of the shaped part. At least a part region of the interior trim part is provided with a support structure which provides a pleasant tactile sensation at the surface of the part region.

According to yet a further aspect of the present invention, a method for producing a vehicle interior trim part is provided. The method includes the steps of producing a shaped part comprising a decorative wear layer and a carrier layer, and attaching a connecting element to the carrier layer. The method also includes the step of producing a supporting structure as a separate supporting element with a connection means. The method further includes the step of mounting the supporting element on the shaped part by connecting the connection means to the connecting element, wherein a tactile sensation is provided at a surface of the supporting structure.

In the following text, exemplary embodiments of the interior trim part according to the invention are shown by way of example, and a method for producing it is described in detail using a plurality of diagrammatic figures. Identical features of the exemplary embodiments are provided with the same designations.

DETAILED DESCRIPTION OF PREFERRED EMBODIMENTS

According to one embodiment, an interior trim part for a passenger compartment of a vehicle is provided. The interior trim part has a shaped part which has a front side which forms a decorative wear layer of the interior trim part, and having at least one carrier layer which forms a rear side of the interior trim part, at least one part region of the interior trim part being provided with at least one supporting structure which provides a pleasant tactile sensation at the surface of the part region.

According to another embodiment, a method for producing an interior trim part is provided. The interior trim part having a front side with a decorative wear layer and, under this, at least one carrier layer which forms the rear side, and at least one part region of the interior trim part being provided with a supporting structure which provides a pleasant tactile sensation at the surface of the part region, comprising the following step: production of a shaped part with a decorative wear layer and at least one carrier layer.

The tactile sensation is the sensory perception via mechanical, thermal and algesic receptors of the nerves. The wear layer can have, for example, a surface which is provided with an esthetic pattern. Grained leather surfaces, wood grains or other natural material surfaces or else textile surfaces are frequently imitated.

Methods for producing parts aspire to produce an interior trim part with as few production steps as possible and to reduce costs. The interior trim part provides an alternative interior trim part for a passenger compartment of a vehicle, which interior trim part can be produced with reduced technical expenditure, and of proposing a method, by way of which the interior trim part can be produced.

According to the embodiments shown, the shaped part has at least one connecting element which is attached to the carrier layer of the rear side of the interior trim part, and that the supporting structure is formed as a separate supporting element and is held by the connecting element of the shaped part. The connecting means of the shaped part can be produced during the production of the shaped part in the same step or be joined to the shaped part in a later step. In order to connect the connection means of the supporting element to the connecting element of the shaped part, different methods can be used, for example welding, latching, clamping, screwing or adhesive bonding. For each of the connecting types mentioned, the connection means and the connecting element can be designed in a special way, in order that the desired connecting method is benefited. An additional element can optionally be provided, for example a threaded nut for a screw connection, a clamping element for a clamping connection or a latching element for a latching connection.

The production method according to one embodiment comprises the following further steps: insertion of the finished shaped part into an injection molding die, attachment of at least one connecting element in the part region to the rear side of the interior trim part by overmolding of the carrier layer by means of the injection molding die, removal of the overmolded shaped part from the injection molding die, production of a supporting structure as a separate supporting element with at least one connection means compatible with that connecting element of the shaped part which is attached to the carrier layer, and mounting of the supporting element on the shaped part by connection of the connection means of the supporting element to the connecting element of the shaped part.

The proposed interior trim part comprises a plurality of components. One component is the prefabricated shaped part. The latter forms the front side of the interior trim part. It is therefore critical for the esthetics, according to one embodiment. Moreover, at least one further component is provided, namely the prefabricated supporting element, which has a critical influence on the quality of that part region which is provided for the tactile sensation, according to one embodiment. The shaped part is the larger of the components. One advantage of the multiple-part construction comprises the fact that it is possible to always use the same production molds for the shaped part.

The shaped part can be produced in different ways, for example by injection molding of a thermoplastic carrier layer material against the wear layer. To this end, first of all the wear layer is inserted into a mold cavity of an injection molding die, and subsequently the thermoplastic carrier layer material is injected into the mold cavity. Here, a uniform connection of the carrier layer material to the wear layer is produced. Another method is reaction injection molding. Here, for example, a foaming carrier layer material is guided into a mold cavity of an injection molding die. The foaming carrier layer material reacts and expands in the mold cavity. Here too, a wear layer has previously been inserted into the mold cavity. Here too, a uniform connection of the foamed carrier layer material to the wear layer is produced. Moreover, any other suitable process can be used to produce the shaped part. If the connecting element has not already been produced during the manufacture of the shaped part, it has to be ensured that the prefabricated shaped part is suitable for it to be possible later to attach a connecting element to its rear side, for example by overmolding in an injection molding die which is provided for this purpose.

The smaller component, namely the supporting element, can be produced in a plurality of variants which each have different qualities. One important quality feature of the interior trim part is the compliance and strength of that part region which is provided for the passenger to make contact with. Here, the supporting element which is attached to the rear side of the part region of the interior trim part has a great influence on the tactile sensation for the passenger.

The multiple-part construction allows supporting elements of different compliance to always be combined with the same shaped part. Thus, a complicated supporting element can be provided for vehicles which are to receive luxury equipment, whereas a supporting element of simple construction is sufficient for a vehicle which is to receive basic equipment.

In one particularly simple embodiment, the supporting element has at least one supporting layer. The supporting element affords a firm foundation below the wear layer of the interior trim part. The supporting layer can be of rigid configuration, in order to benefit the strengthening effect. It is helpful if the supporting element has at least one connection means which fits together with the connecting element of the shaped part. The connecting element favorably has thermoplastic material, and the thermoplastic material is connected to the shaped part by overmolding on the rear side of the interior trim part.

One development of the interior trim part provides for the supporting element which is provided with the supporting layer to be provided additionally with at least one cushioning layer. The cushioning layer is arranged on that side of the supporting layer which faces the shaped part in the mounted state. During the mounting of the supporting element on the shaped part, the cushioning layer is brought into contact with the shaped part. Here, the contact faces can be additionally connected to one another, for example with a material to material fit by welding or adhesive bonding. In the part region, in which the cushioning layer comes into contact with the shaped part, the carrier layer of the shaped part can have a cutout, in order that the cushioning layer of the supporting layer bears directly against the wear layer of the shaped part.

Supporting elements can be produced, the cushioning layers of which have different dimensions, in particular have a different thickness. Interior trim parts having a varying cushioning quality can therefore be produced. Furthermore, the construction can be designed in such a way that the cushioning layer of the supporting element is compressed in the mounted state. As a result, firm cushioning is obtained. The amount of compression and also the cushioning thickness can be varied, as a result of which a multiplicity of possible combinations are produced.

The carrier layer of the shaped part can also have a flexible material. If the carrier layer is combined with a supporting element which is provided with a cushioning layer, the flexible properties of the carrier layer (shaped part) and the flexible properties of the cushioning layer (supporting element) are adapted to one another. As a result of the selection of different flexible properties, the cushioning quality can be set. It goes without saying that the flexible properties of the cushioning layer and the carrier layer can also be identical.

In order to make simple mounting possible, the overmolded connecting element has the shape of a connecting mushroom, with a cap which faces the carrier layer and is connected to the latter, and with a connecting shaft which faces away from the carrier layer and projects from the latter. The connecting mushroom is part of a plug-in connection. The second part of the plug-in connection forms the connection means of the supporting element. The connecting means is of complementary design and can preferably be latched to the connecting mushroom.

Figures 1A, 1B:
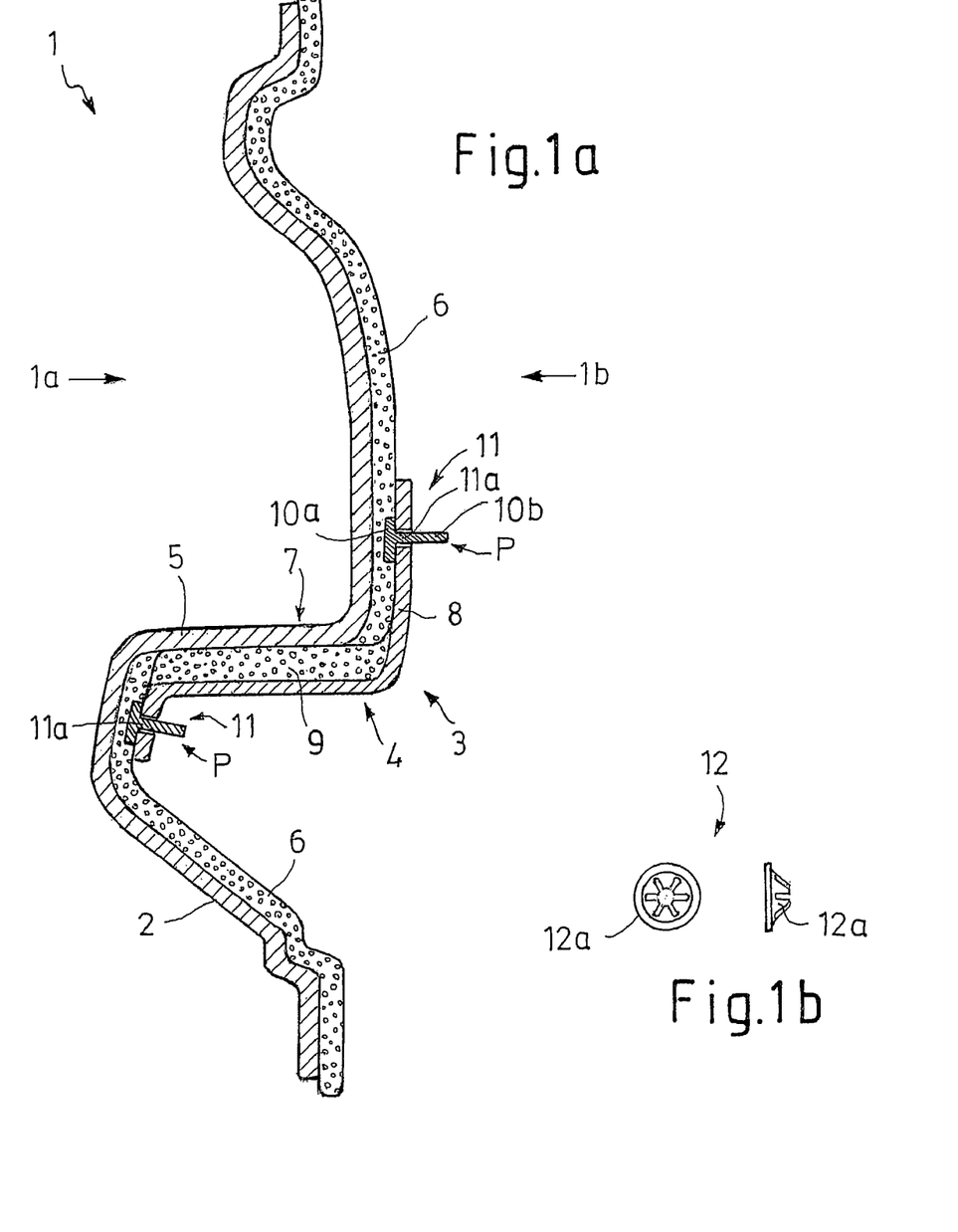
FIG. 1a is a cross-sectional view that shows an interior trim part comprising a shaped part and a separate supporting element which is mounted on it.
FIG. 1b illustrates front and side views of a clamping washer that may be fastened to the connecting shaft is illustrated.

FIG. 1a represents an interior trim part 1 according to one embodiment in section. Trim part 1 has a shaped part 2, on which a supporting structure 3 is mounted in the form of a separate supporting element 4.

The shaped part 2 comprises a decorative wear layer 5 which forms a front side 1a of the interior trim part 1, and a carrier layer 6 which forms a rear side 1b of the interior trim part 1. The wear layer 5 comprises a decorative film with thermoplastic properties. The carrier layer 6 has a flexible foam material. The latter has thermoplastic properties, in order that it can be deformed under heat and pressure. The carrier layer 6 is provided with a cutout 7 for the supporting element 4. The latter has a supporting layer 8 and an additional cushioning layer 9. In this exemplary embodiment, the cushioning layer 9 of the supporting element 4 reaches through the cutout 7 of the carrier layer 6 of the shaped part 2 and has direct contact with the wear layer 5 of the shaped part 2. The wear layer 5 is compliant. In the case of a force which acts from the outside, it can be deformed elastically together with the cushioning layer 9 which lies below it, and can return to its neutral shape when the force is taken away.

For the purpose of connecting the supporting element 4 to the shaped part 2, connecting elements 10 are attached to the carrier layer 6 of the shaped part 2. The supporting element 4 has connection means 11 which fit together with the connecting elements 10 of the shaped part 2. Each connecting element 10 is provided with a cap 10a and a connecting shaft 10b which projects from the carrier layer 6 of the shaped part 2. The connection means 11 have plug-through openings 11a. The connecting shafts 10b penetrate the plug-through openings 11a. In order to secure the plugged together plug-through connection, in each case a clamping element 12 which corresponds to the clamping washer 12a shown in two views in FIG. 1b is fastened to the free end of the connecting shaft 10b.

Figure 2A:
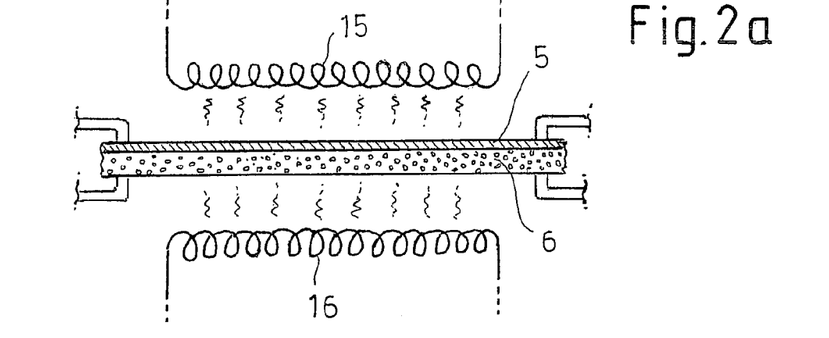
FIGS. 2a-c show three steps of the prefabrication of a shaped part.
Figure 2B:
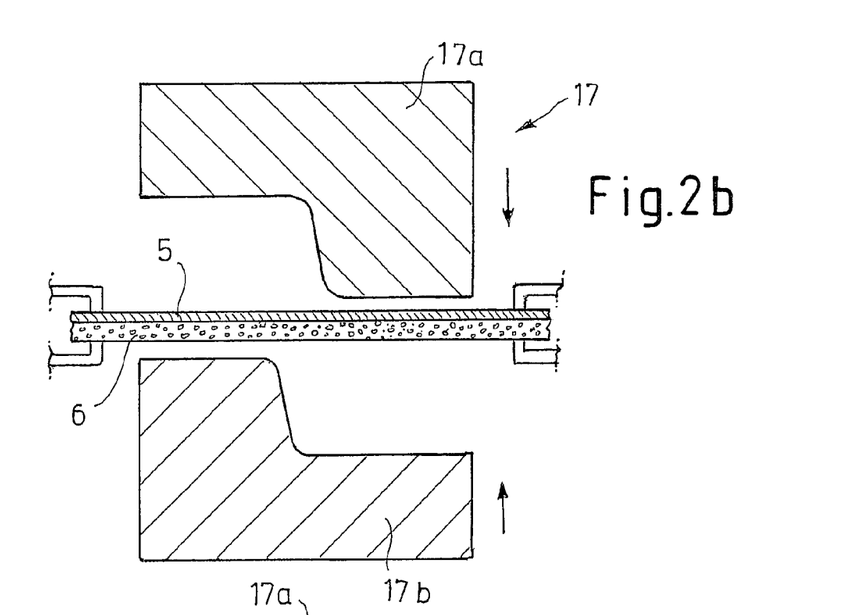
Figure 2C:
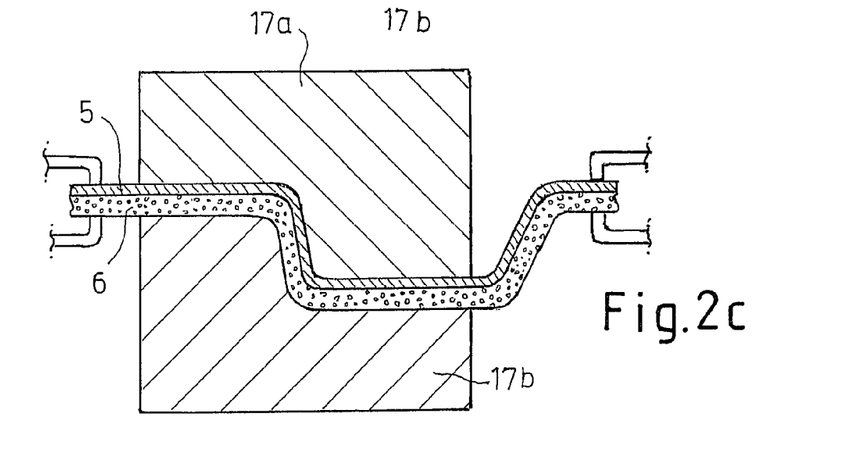

FIGS. 2a to 2c represent one example for the prefabrication of a shaped part 2. The carrier layer 6 and the wear layer 5 are first of all heated, as is symbolized in FIG. 2a using a diagrammatically shown upper heating coil 15 and a lower heating coil 16. The shaping takes place by means of a mold 17. FIG. 2b shows this mold 17 with a first upper mold part 17a and a second lower mold part 17b in the open state. In FIG. 2c, the upper mold part 17a and the lower mold part 17b are moved toward one another. The closed mold parts 17a/17b have given a shape to the material of the carrier layer 6 and of the wear layer 5. After forming, the shaped part 2 retains this shape.

Figure 3A:
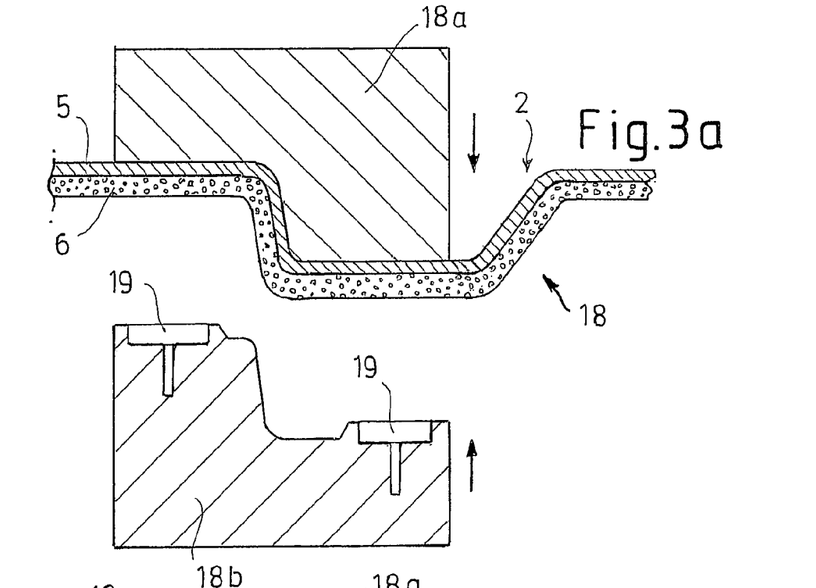
FIGS. 3a-b show two steps for attaching connecting elements to the prefabricated shaped part by means of an injection molding die.
Figure 3B:
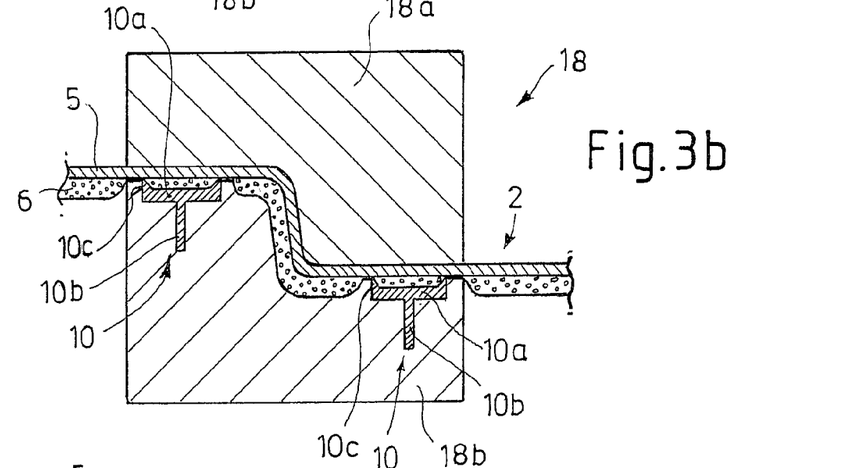
Figure 3C:
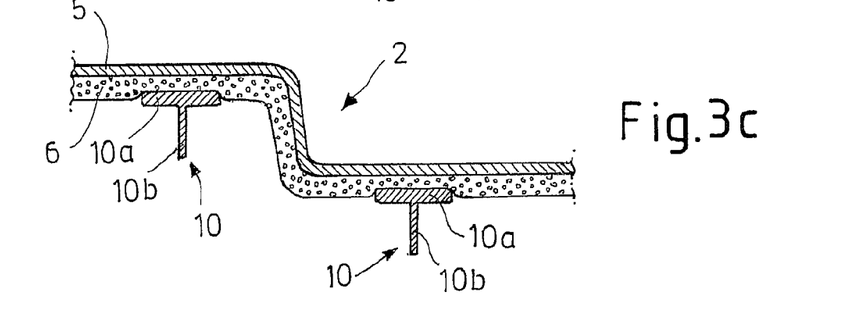
FIG. 3c is a cross-sectional view that shows the shaped part according to FIG. 3b, removed from the injection molding die.

FIGS. 3a to 3c illustrate the further processing of the shaped part 2 which can be seen in FIG. 2c and to which connecting elements 10 then also have to be attached. According to FIG. 3a, an injection molding die 18 is used for this purpose with a first upper die part 18a and a second lower die part 18b. The lower die part 18b has two shaping regions 19 which are provided in each case to produce a connecting element 10. FIG. 3b shows the closed state of the die parts 18a/18b. Thermoplastic material is injected into the shaping regions 19 mentioned. The thermoplastic material forms the connecting elements 10, namely two connecting mushrooms P, on the carrier layer 6 of the shaped part 2. Each connecting mushroom P has a cap 10a, by way of which it is molded onto the carrier layer 6 of the shaped part 2. Moreover, a connecting shaft 10b which projects from the carrier layer 6 is arranged on the cap 10a. Facing the wear layer 5, the cap 10a has a cap edge 10c. The second die part 18b is designed in such a way that the foam of the carrier layer 6 is compressed greatly at the edge of the shaping region 19, in order that the thermoplastic injection molding material cannot escape between the foam pores. The connecting mushroom P which is molded on can reach as far as the wear layer 5, at least at its cap edge 10c, or is connected only superficially to the carrier layer 6.

FIG. 3c shows one exemplary embodiment for the demolded shaped part 2 with overmolded connecting elements 10. After this, the cap 10a of the connecting mushroom P clings to the carrier layer 6 of the shaped part 2 by adhesion. The foam material of the carrier layer 6 can remain compressed after the overmolding. As a result, it has a lower thickness under the connecting mushrooms P than next to the connecting mushrooms.

Figure 4A:
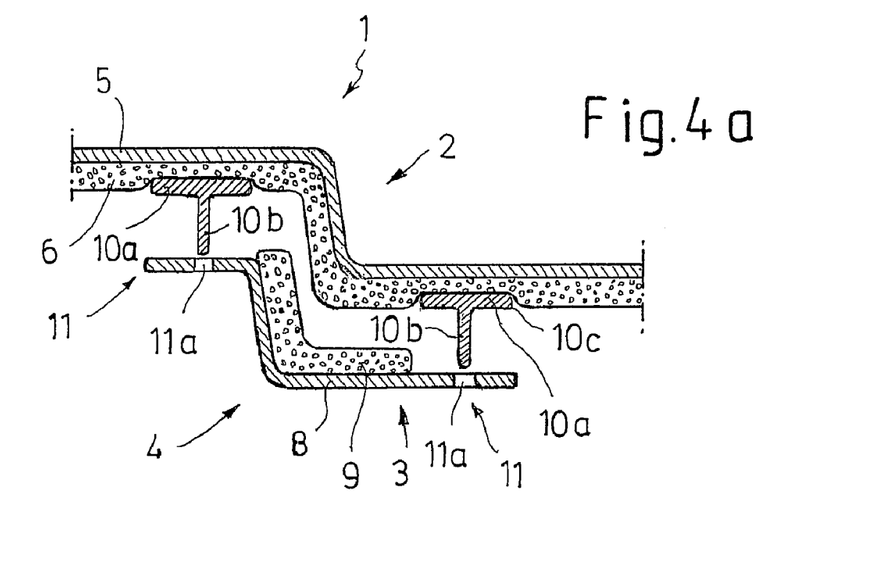
FIGS. 4a-b show the mounting of a separate supporting element to the shaped part according to FIG. 4.
Figure 4B:
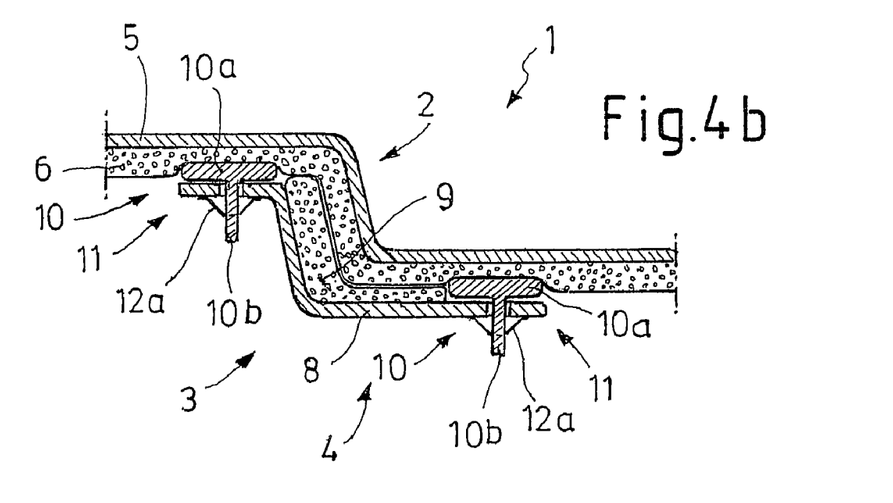

The principle of the mounting of an interior trim part 1 is shown diagrammatically in FIGS. 4a and 4b. According to FIG. 4a, the shaped part 2 and the supporting element 4 are moved toward one another for the purpose of mounting. Once again, the supporting element 4 has a supporting layer 8 and a cushioning layer 9. However, the shaped part 2 differs from the shaped part 2 shown in FIG. 1a because its carrier layer 9 does not have a cutout. The cushioning layer 9 of the supporting element 4 therefore has no contact with the wear layer 5 of the shaped part 2. Instead, the cushioning layer 9 touches the flexible carrier layer 6 of the shaped part 2.

The supporting layer 8 is provided with connection means 11 in the form of plug-through openings 11a. The shaped part 2 is provided with overmolded connecting elements 10 which have a cap 10a and a connecting shaft 10b. The plug-through openings 11a of the supporting element 4 fit together within each case one of the connecting shafts 10b of the shaped part 2. A plug-through connection according to FIG. 4b is produced. In order to secure this plug-through connection, in each case one clamping element 12 is joined to the free end of each connecting shaft 10b. The clamping element 12 is a clamping washer, as shown in FIG. 1b. The clamping washer 12a clamps fixedly to the connecting shaft 10b and, as a result, prevents the supporting element 4 and the shaped part 2 from moving apart from one another.

The cushioning layer 9 of the supporting element 4 is pressed against the carrier layer 6 of the shaped part 2 in the mounted state. As a result, the carrier layer 6 and the cushioning layer 9 are compressed and become firmer. The quality of the carrier layer 6 and of the cushioning layer 9 can be identical or different. The cushioning of the interior trim part 1 can be adapted as desired by a suitable selection and combination of these two layers, in order to form a high-quality or simpler interface for the tactile sensation.

Figure 5:
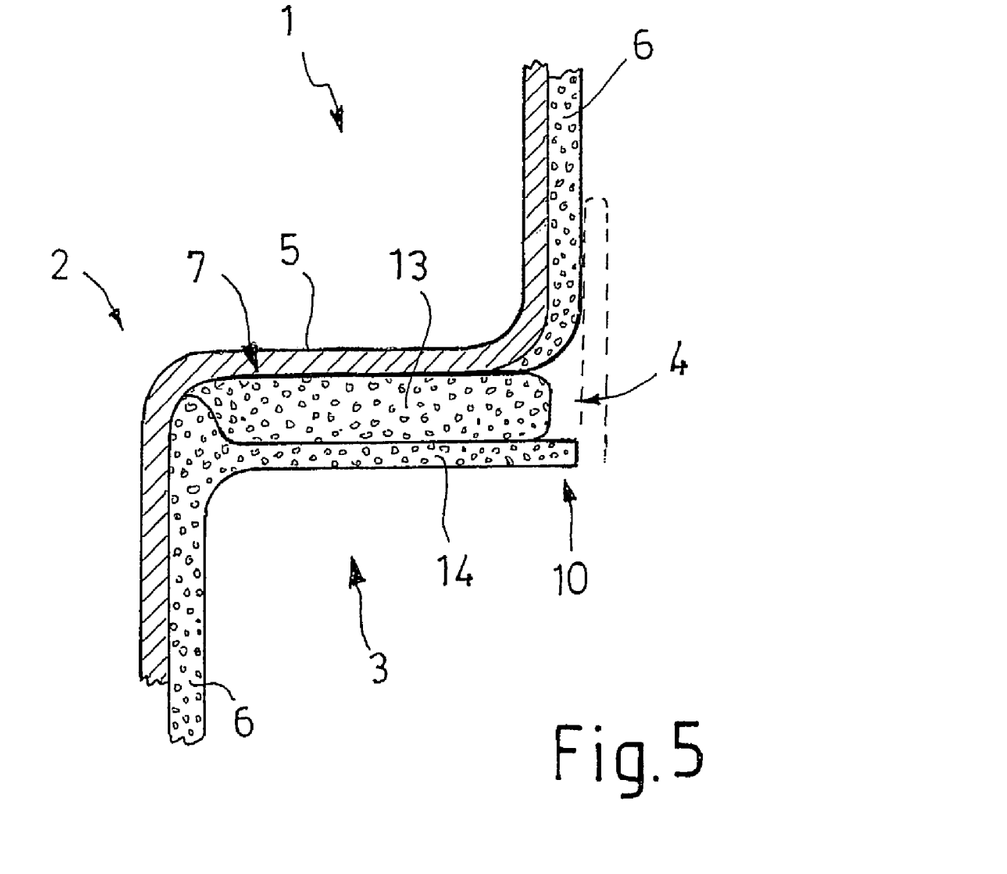
FIG. 5 is a cross-sectional view that shows one alternative embodiment of an interior trim part.

FIG. 5 shows one further exemplary embodiment of an interior trim part 1. According to the figures, the shaped part 2 is formed with a wear layer 5 and a special carrier layer 6. A supporting structure 3 is provided which has a separate supporting element 4 which is configured as a cushioning layer 13. This is an interior trim part 1 with an armrest in the part region of the supporting structure 3. The carrier layer 6 of the shaped part 2 has a connecting means 10 which mounts the supporting element 4 which is configured as a cushioning layer 13. For the purpose of mounting the supporting element 4, the connecting means 10 is configured as a bracket element 14. The bracket element 14 carries the cushioning layer 13. The latter is enclosed between the bracket element 14 and the wear layer 5 of the shaped part 2. Moreover, the carrier layer 6 has a cutout 7. The cushioning layer 13 has direct contact with the wear layer 5 of the shaped part 2.

An interior trim part of this type is preferably used where a passenger can come into contact with the interior trim part during operation of the vehicle. For example, a vehicle door can be provided with an interior trim part which has an integrated armrest. The interior trim part can also have an ergonomic function, as is the case in an integrated armrest, on which the passenger is to be able to support himself comfortably. As a result of the contact, the passenger is given a tactile sensation of the surface of the interior trim part. Because he may also exert a pressure onto the surface, a supporting structure is as a rule provided under the surface, which supporting structure can absorb the force acting from the outside. The supporting structure is compliant. The compliance can likewise be sensed by the passenger. In this way, the structure which lies below the surface also gives the passenger a sensation concerning the quality of the interior trim part. That part region of the interior trim part, in which a tactile sensation is expected by the passenger, forms an interface, at which the sensations are generated. This part region of the interior trim part with a supporting structure which contains flexible material, for example foam.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An interior trim part for a passenger compartment of a vehicle, said trim part comprising:
   a shaped part comprising a front side which forms a decorative wear layer of the interior trim part and at least one carrier layer which forms a rear side of the interior trim part, the shaped part having at least one connecting element which is attached to the carrier layer of the rear side of the interior trim part; and
   at least one supporting structure provided with at least one part region of the interior trim part, said at least one supporting structure providing a pleasant tactile sensation at a surface of the part region, wherein the supporting structure is formed as a separate supporting element and is held by the connecting element of the shaped part.

2. The interior trim part of claim 1, wherein the connecting element has thermoplastic material, and wherein the thermoplastic material is connected to the shaped part by overmolding on the rear side of the interior trim part.

3. The interior trim part of claim 2, wherein the overmolded connecting element has the shape of a connecting mushroom with a cap which faces the carrier layer and is connected to the carrier layer, and with a connecting shaft which faces away from the carrier layer and projects from the carrier layer.

4. The interior trim part of claim 3 further comprising a clamping element connected to the shaft to secure the supporting structure to the shaped part.

5. The interior trim part of claim 1, wherein the supporting element has at least one supporting layer.

6. The interior trim part of claim 1, wherein the supporting element has at least one connection means which fits together with the connecting element of the shaped part.

7. The interior trim part of claim 1, wherein the supporting element is provided with at least one cushioning layer.

8. The interior trim part of claim 1, wherein the carrier layer is produced from a flexible material.

9. A vehicle interior trim part comprising:
   a shaped part comprising a decorative wear layer, a carrier layer, and a connecting element molded to the carrier layer; and
   a supporting structure providing a pleasant tactile sensation, wherein the supporting structure is formed as a separate supporting element and is connected to the shaped part by the connecting element.

10. The interior trim part of claim 9, wherein the supporting structure is provided with at least one part region of the interior trim part, and the pleasant tactile sensation is provided at the surface of the at least one part region.

11. The interior trim part of claim 9, wherein the connecting element comprises a cap molded to the carrier layer, said connecting element further comprising a shaft extending through an opening in the supporting structure.

12. The interior trim part of claim 11 further comprising a clamping element connected to the shaft to secure the supporting structure to the shaped part.

13. The interior trim part of claim 9, wherein the connecting element is overmolded to the carrier layer 14. A method for producing an interior trim part for a passenger compartment of a vehicle, said method comprising the steps of:
   producing a shaped part with a decorative wear layer and at least one carrier layer;
   inserting the finished shaped part into an injection molding die;
   attaching at least one connecting element in the part region to the rear side of the interior trim part by overmolding the at least one connecting element onto the carrier layer by way of an injection molding die;
   removing the overmolded shaped part from the injection molding die;
   producing at least one supporting structure as a separate supporting element with at least one connection means compatible with the connecting element of the shaped part which is attached to the carrier layer; and
   mounting the supporting element on the shaped part by connection of the connection means of the supporting element to the connecting element of the shaped part, wherein at least one part region of the interior trim part is provided with a support structure which provides a pleasant tactile sensation at a surface of the part region.

15. A method for producing a vehicle interior trim part comprising:
   producing a shaped part comprising a decorative wear layer and a carrier layer;
   molding a connecting element to the carrier layer;

producing a supporting structure as a separate supporting element with a connection means; and mounting the supporting element on the shaped part by connecting the connecting means to the connecting element, wherein a tactile sensation is provided at a surface of the supporting structure.

16. The method of claim 15, wherein the step of molding comprises molding the connecting element in a part region of the interior trim part by overmolding the carrier layer in an injection molding die.

17. The method of claim 15, wherein the connecting element comprises a cap molded to the carrier layer and a shaft that connects to the connecting means.

18. The method of claim 17, wherein the connecting means comprises an opening for receiving the shaft.

19. The method of claim 18 further comprising the step of attaching a clamping element to the shaft to secure the supporting structure on the shaped part.

* * * * *